(12) United States Patent
Younes et al.

(10) Patent No.: US 9,222,480 B2
(45) Date of Patent: Dec. 29, 2015

(54) INTEGRATED METHOD OF DRIVING A $CO_2$ COMPRESSOR OF A $CO_2$-CAPTURE SYSTEM USING WASTE HEAT FROM AN INTERNAL COMBUSTION ENGINE ON BOARD A MOBILE SOURCE

(71) Applicant: Saudi Arabian Oil Company, Dhahran (SA)

(72) Inventors: Mourad Victor Younes, Abqaiq (SA); Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 158 days.

(21) Appl. No.: 13/974,736

(22) Filed: Aug. 23, 2013

(65) Prior Publication Data
US 2014/0056687 A1   Feb. 27, 2014

Related U.S. Application Data

(60) Provisional application No. 61/692,963, filed on Aug. 24, 2012.

(51) Int. Cl.
| | |
|---|---|
| F01K 23/10 | (2006.01) |
| F01K 25/08 | (2006.01) |
| F04D 27/00 | (2006.01) |
| F01N 3/08 | (2006.01) |
| F01N 5/02 | (2006.01) |
| F01N 5/04 | (2006.01) |
| F02B 37/00 | (2006.01) |
| F02B 37/10 | (2006.01) |
| F04D 27/02 | (2006.01) |
| B01D 53/14 | (2006.01) |

(52) U.S. Cl.
CPC  *F04D 27/00* (2013.01); *F01N 3/08* (2013.01); *F01N 5/02* (2013.01); *F01N 5/04* (2013.01); *F02B 37/005* (2013.01); *F02B 37/10* (2013.01); *F04D 27/02* (2013.01); *B01D 53/1475* (2013.01); *B01D 2252/20405* (2013.01); *B01D 2252/20421* (2013.01); *B01D 2252/20484* (2013.01); *B01D 2257/504* (2013.01); *B01D 2259/4566* (2013.01); *F01N 2570/10* (2013.01); *Y02C 10/06* (2013.01); *Y02T 10/144* (2013.01); *Y02T 10/16* (2013.01)

(58) Field of Classification Search
CPC ....... F04D 27/00; F04D 27/02; F02B 37/005; F02B 37/10; F01N 3/08; F01N 5/04; F01N 5/02; F01N 2570/10; Y02C 10/06; Y02T 10/16; Y02T 10/144; B01D 53/1475; B01D 2252/20405; B01D 2252/20421; B01D 2259/4566; B01D 2252/20484; B01D 2257/504
USPC .................... 60/614, 616, 618, 651, 671, 659
See application file for complete search history.

(56) References Cited

U.S. PATENT DOCUMENTS

| | | | |
|---|---|---|---|
| 6,256,994 B1 * | 7/2001 | Dillon, IV | 60/649 |
| 6,553,764 B1 * | 4/2003 | Gladden et al. | 60/608 |

(Continued)

*Primary Examiner* — Hoang Nguyen
(74) *Attorney, Agent, or Firm* — Abelman, Frayne & Schwab

(57) ABSTRACT

An integrated system and method for driving a $CO_2$ compressor to densify $CO_2$ captured from the exhaust gas stream of an internal combustion engine on board a mobile source of $CO_2$ includes operating a turbine that is operatively connected to the power input or drive shaft of the $CO_2$ compressor, and operatively connecting a motor-generator to the turbine for (a) recovery of any excess power when the turbine-generated power exceeds the $CO_2$ compressor power demand and (b) providing supplemental power when the turbine-generated power is insufficient to meet the $CO_2$ compressor power demand.

11 Claims, 5 Drawing Sheets

(56) References Cited

U.S. PATENT DOCUMENTS

| | | |
|---|---|---|
| 8,063,511 B2 * | 11/2011 | Vandor .......................... 307/64 |
| 2003/0101728 A1 * | 6/2003 | Wakana et al. ................ 60/727 |
| 2009/0025386 A1 | 1/2009 | Rumsby |
| 2009/0313990 A1 | 12/2009 | Mustafa |
| 2011/0304155 A1 * | 12/2011 | Hoffmann et al. ............ 290/1 R |

* cited by examiner

INTEGRATED METHOD OF DRIVING A $CO_2$ COMPRESSOR OF A $CO_2$-CAPTURE SYSTEM USING WASTE HEAT FROM AN INTERNAL COMBUSTION ENGINE ON BOARD A MOBILE SOURCE

BACKGROUND OF THE INVENTION

1. Field of the Invention

The present invention relates to carbon dioxide ($CO_2$) compression and storage for $CO_2$ emission reduction purposes in mobile applications or in applications where an energy production cycle is used to produce work and where $CO_2$ compression is required.

2. Description of the Prior Art

The currently accepted thinking is that global warming is due to emissions of greenhouse gases such as $CO_2$ and methane ($CH_4$). About a quarter of global $CO_2$ emissions are currently estimated to come from mobile sources, i.e., automobiles, trucks, buses and trains that are powered by internal combustion engines (ICEs). This proportional contribution is likely to grow rapidly in the foreseeable future with the projected surge in automobile and truck ownership in developing countries. Accordingly, controlling $CO_2$ emissions is very important.

Carbon dioxide management from mobile sources presents many challenges including space and weight limitations, the lack of any economies of scale and the dynamic nature of the operation of the ICEs powering the mobile sources.

Prior art methods for the capture of $CO_2$ from combustion gases have principally focused on stationary sources, such as power plants. Those that address the problem of reducing $CO_2$ emissions from mobile sources employ combustion using oxygen and provide no means for the regeneration and reuse of the $CO_2$ capture agent, and/or make no use of waste heat recovered from a heat source. Combustion using only oxygen requires an oxygen-nitrogen separation step which is more energy-intensive than separating $CO_2$ from the nitrogen-containing exhaust gases resulting from the use of atmospheric air and the separation problem would be made even more difficult if attempted on board the vehicle.

The focus of $CO_2$ capture technology has been on stationary or fixed sources. The capture of $CO_2$ from mobile sources has generally been considered too expensive, since it involves a distributed system with a reverse economy of scale. The prior solution to the problem has appeared to be impractical due to on-board vehicle space limitations, the additional energy and apparatus requirements, and the dynamic nature of the vehicle's operating cycle, e.g., intermittent periods of rapid acceleration and deceleration.

Methods, systems, and apparatus that address the problems of efficiently and cost-effectively reducing the $CO_2$ emissions from mobile sources, e.g., vehicles powered by internal combustion engines, by the capture and temporary on-board storage of the $CO_2$ from the engine's exhaust gas stream are still in their infancy.

As used herein, the term "internal combustion engine", or ICE, includes heat engines in which a hydrocarbon-containing fuel, typically a conventional liquid hydrocarbon fuel, is burned to produce power or work and generates waste heat that must be removed or dissipated.

As used herein, the term "mobile source" means any of the wide variety of known conveyances that can be used to transport goods and/or people that are powered by one or more internal combustion engines that produce an exhaust gas stream containing $CO_2$. This includes all types of motor vehicles that travel on land, airplanes and ships where the exhaust gas from the ICE is discharged into a containing conduit before it is discharged into the atmosphere.

As used herein, the term "waste heat" is the heat that a typical ICE produces that is contained principally in the hot exhaust gases (~300° C. to 650° C.) and the hot coolant (~90° C. to 120° C.). Additional heat is emitted and lost by convection and radiation from the engine block and its associated components, including heat transfer fins and surfaces of air-cooled engines, and the components through which the exhaust gas passes, including the manifold, pipes, catalytic converter and muffler. This heat energy totals about 60% of the energy that typical hydrocarbon (HC) fuels produce when combusted.

The term "vehicle" as used herein is to be understood as a convenient shorthand and synonymous with "mobile source" and is coexistensive with "conveyances", generally, as that term is used above.

The methods and systems for on-board treatment of an exhaust stream containing $CO_2$ emitted by a hydrocarbon-fueled ICE used to power a vehicle in order to reduce the amount of $CO_2$ discharged into the atmosphere, include, among others, a process of $CO_2$ densification, which involves reducing the temperature and volume of the $CO_2$ to at least a liquefied state. Densification includes separation of substantially pure $CO_2$ from the engine exhaust gases and temporary storage of the densified $CO_2$ on board the vehicle for later use in any of a wide variety of known commercial and industrial uses, or for transfer to a permanent storage site.

An important part of any apparatus and method used for $CO_2$ recovery is the use of a $CO_2$ compressor that requires mechanical energy for its operation. However, providing the mechanical energy for operating or driving the compressor is accompanied by the problems associated with providing auxiliary power to meet the requirements of operating the $CO_2$ compressor.

Accordingly, a problem addressed by the present invention is how to meet the objective of minimizing energy burdens imposed on the ICE or by the consumption of additional fuel for driving a $CO_2$ compressor associated with an on-board $CO_2$ capture system for removing $CO_2$ from the exhaust gas stream produced by the ICE that powers the mobile source.

SUMMARY OF THE INVENTION

The above and other objects and advantages of the present invention, which will become apparent from the description which follows, are achieved by providing an integrated system and method for driving a $CO_2$ compressor to densify $CO_2$ captured from the exhaust gas stream of an ICE on board a mobile source of $CO_2$, which includes the steps of providing a turbine that is operatively connected to the power input or drive shaft of the $CO_2$ compressor, and operatively connecting a motor-generator to the turbine for (a) recovery of any excess power when the turbine-generated power exceeds the $CO_2$ compressor power demand, and (b) providing supplemental power when the turbine-generated power is insufficient to meet the $CO_2$ compressor power demand.

The inventive method minimizes the energy needs for the $CO_2$ compression step and efficiently manages the flow of energy between the different components of the system. The inventive method also allows a smoother integration of the $CO_2$ capture system and specifically the $CO_2$ compression step, with the energy recovery system. The method and system of the invention minimizes the components required and increases the overall efficiency of the ICE and the densification of the $CO_2$ captured from the exhaust gas stream.

The turbine can be operated by any working fluid under pressure and typically a working fluid from an open or closed power cycle like the Rankine cycle or trilateral flash cycle or other cycle in which a working fluid is compressed, optionally heated, and then expanded in a turbine.

The heat can be recovered from the ICE's waste heat sources which include the cooling system and/or the engine block and/or the exhaust gases. Energy in the form of heat can also be recovered from non-conventional on-board sources such as solar panels installed on the vehicle's exterior surfaces, intercoolers, the $CO_2$ compressor, the vehicle's air conditioning condenser, brake assemblies, and/or other sources of heat that can be installed on, or derived from the mobile source.

In an embodiment, the heat removed from the $CO_2$ stream during the $CO_2$ compression step can be transferred to the working fluid to increase the efficiency of the system. The transfer can be by direct heat exchange with the compressor cylinder cooling fans, or the like.

The working fluid entering the turbine can be in the form of a superheated vapor or a saturated vapor, a supercritical fluid, a two-phase vapor/liquid state or even a liquid, or a saturated liquid. Regardless of its state, the working fluid entering the turbine is defined by the power cycle parameters of pressure and temperature.

The working fluid exiting the turbine can be in a superheated state, a saturated vapor state, liquid state, saturated liquid state, supercritical state, or in a two-phase vapor/liquid state or vapor/solid state. However the presence of a solid or solids in the exiting fluid is not preferred. The working fluid outlet parameters depend on the working fluid inlet parameters of temperature and pressure, and on the turbine's compression ratio or power cycle low pressure value.

The turbine used in the method and system of the invention can employ any available technology including for example, centrifugal, scroll, screw, volumetric and piston turbines. The turbine can have one expansion stage or several expansion stages, with optional intercooling. Since the objective is to expand the available flow of working fluid from the inlet parameters through the power cycle to a lower pressure value while recovering the expansion work, these parameters of the available fluid(s) will determine the specific type of turbine chosen for the vehicle.

The turbine can be lubricated or not, and can use any bearing type including journal bearings, sleeves, rolling element bearings, or others and the selection is based on the turbine and the working parameters of temperature and pressure.

The $CO_2$ compressor can have a fixed displacement/cylinder capacity or a variable displacement/cylinder capacity. A variable displacement/cylinder capacity compressor offers more control parameters which can be used to optimize on-board performance of the integrated system.

In a preferred embodiment, direct coupling and matching of the turbine and compressor speed is achieved for the amount of $CO_2$ from the exhaust gas stream by adjusting the compressor displacement/cylinder capacity. The integrated compressor and the turbine can be arranged and controlled to operate at the same rotational speed or at a fixed rotational speed. In the system where their rotational speed is fixed, the $CO_2$ compressor is linked or coupled directly to the turbine axle and no velocity coupling device is required. A velocity coupling device is required if the $CO_2$ compressor and the turbine are configured to rotate at different speeds. Any suitable velocity coupling device can be used.

A motor-generator set is used to generate electricity and provide electricity to the turbine/compressor set. Any suitable known commercial technology can be used for the motor-generator and its control/command set. The use of the motor-generator in the turbine/compressor set will be referred to herein as the integrated hybrid turbine/compressor set.

The motor-generator delivers power to the turbine/compressor set when insufficient power is available on the turbine shaft to power the compressor. The motor-generator is also arranged and configured to recover the excess mechanical power available from the turbine shaft and convert it to electricity when the turbine output power exceeds the $CO_2$ compressor's demand.

In an embodiment of the system, the generator follows the compressor or the turbine trend so that the use of even one coupling device is optional. Thus, in an embodiment in which the $CO_2$ compressor and the motor-generator have the same rotational speed, no coupling device is required. In another embodiment, the system utilizes two coupling devices. Coupling devices synchronize the power and the velocity of the different components on the axle.

Coupling devices are used in the system of the invention to reduce the rotational speed or control the speed to prevent an overrunning, or to synchronize the speed allowing limited slip, or to uncouple the rotation. The devices can be combined to perform a combination of these functions.

The coupling device can be a simple clutch, a multi-disc clutch, a hydraulic clutch, a visco-coupling device, a torque-sensing traction clutch, also known in the art as a TORSEN™ clutch, an epicyclical or planetary gear, a one-way clutch, an overrunning or freewheel clutch, a speed reducing gearbox, or a continuously variable transmission (CVT).

In certain embodiments, a planetary gear, a speed reducing gearbox or a CVT is installed between the turbine and compressor to control their relative rotational speeds. An overrunning clutch or a one-way clutch can also be incorporated into the mechanical control system to disengage the drive shaft from the driven shaft of the $CO_2$ compressor.

The hybrid turbine/compressor set allows coupling of the two systems having different kinetics that serve the different purposes of the invention. Including the electric motor-generator set enhances the flexibility of the system since it can further regulate the flow of energy between the different components.

The system can also function without an electric motor-generator. In this embodiment, the constraints on the turbine and compressor will be greater and the overall efficiency of the integrated system and the $CO_2$ compressor may be reduced.

The energy recovery system and power operating production cycle are dependent upon the engine type and its transients for the heat that is recovered from the exhaust gas stream and/or cooling system, while the $CO_2$ flow rate depends at least in part on the $CO_2$ capture system and the $CO_2$ capture rate.

The energy recovery system and the $CO_2$ capture system have different inertia and under certain operating conditions, more energy can be provided by the turbine than is required by the $CO_2$ compressor, making it advantageous to incorporate the generator into the system in order to recover the excess work, or kinetic energy, and convert it to electricity which can be supplied to the on-board storage battery or supplied directly to the vehicle's electrical system.

In the case of either the simple option or the hybrid option, it is preferred that a buffer tank be provided upstream of the $CO_2$ compressor inlet. The buffer tank serves to regulate the $CO_2$ pressure and $CO_2$ flow at the $CO_2$ compressor inlet. During deceleration, the power available from the turbine might be insufficient to meet the power required by the $CO_2$ compressor; it is thus preferable to have a buffer tank to limit the $CO_2$ flow in one case and/or have the motor-generator that is operated as a motor to provide the additional power required by the compressor to compress the $CO_2$.

In this embodiment, the system of the invention can decouple or regulate the flow of energy available from the turbine axle and the energy required by the $CO_2$ compressor to compress the $CO_2$ in order to maximize the efficient operation of the system, minimize the need to take operating energy from the ICE and thereby minimize overall fuel consumption and the corresponding $CO_2$ production associated with the $CO_2$ capture system and compression step(s).

The $CO_2$ is compressed for storage in a tank on board the mobile source, and the $CO_2$ maximum or final pressure depends on the amount of $CO_2$ that is stored in the tank. It is thus necessary to regulate and adapt the flow of $CO_2$ to the operating curve of the compressor independently of the operation of the turbine. This can be accomplished by use of a variable displacement/cylinder capacity and/or a variable speed gearbox or train, such as a CVT.

Depending on the $CO_2$ tank pressure and the $CO_2$ flow which in turn, are the result of the $CO_2$ capture rate and exhaust gas flow, it is possible to control the speed of the compressor independently of the speed of the turbine, which is the result of the exhaust flow and temperature and to provide or retrieve the extra power on the axle by the motor-generator in order to achieve a smooth and continuous operation independently of the variable operational parameters of the other components of the system.

The turbine operated by the energy recovery system and power cycle can be replaced by a turbine driven by the exhaust gas stream as in the case of, for example, the turbine of a turbo-compressor. The turbine can thus be a simple turbine operated by the exhaust pressure and exhaust flow rate for a non-turbo charged or supercharged atmospheric engine. It is also possible to use such a turbine in a supercharged engine or in a turbo-charged engine. In the latter case, the air compressor, exhaust turbine and $CO_2$ compressor can be linked on a single axle. In another hybrid embodiment, a motor-generator is linked to the same axle to assist in meeting the energy requirement and the recovery of any excess energy available in the integrated system.

The power requirement of the $CO_2$ compressor and the power output of the turbine are continuously monitored by sensors that transmit data to an appropriately programmed on-board microprocessor/controller. Sensors associated with the operation of the ICE also send signals for input to the microprocessors. Data indicating acceleration and deceleration of the ICE reflect the volumetric flow rate, temperature and pressure changes of the exhaust gas stream.

Appropriate switch gear is also linked to the microprocessor controller and to the motor-generator, as are any coupling devices that are incorporated into the system.

In the practice of the method of the invention, the signals from the sensors associated with the engine control unit (ECU), also referred to as the engine management system that optimizes the performance of the ICE under varying operating conditions, as well as sensors associated with the $CO_2$ compressor are processed and control signals are sent to the compressor and working fluid control subsystem to either increase or reduce the turbine power output to meet the power input requirement of the compressor in real time. In a preferred embodiment, the microprocessor maintains a steady-state operating condition, for example, by use of actuators that control valves to admit and discharge $CO_2$, respectively, to and from the $CO_2$ buffer tank, and by the controlled metering of the $CO_2$ to the compressor.

When the power produced by the turbine is insufficient to meet the compressor's requirements, the electric motor of the motor-generator is activated, e.g., by switching on electricity from the vehicle's battery or a thermoelectric device that is powered by an on-board heat source. In the event that the microprocessor determines that the turbine is producing more mechanical energy than is required to operate the compressor, a coupling device is activated to engage the generator of the motor-generator and its output is connected to charge the storage battery on board the vehicle. As will be apparent to one of ordinary skill in the art from the embodiment described above, various other arrangements of the system components can be made to maximize the efficient operation of the $CO_2$ capture, compression, densification and storage on board the vehicle.

The novel features of the present invention which are characteristic of the invention are set forth in the appended claims. The invention itself, however, together with additional advantages and objects, will be best understood from the following detailed description of the preferred embodiments, when read with reference to the accompanying drawings.

BRIEF DESCRIPTION OF THE DRAWINGS

In the attached drawings, the same or similar elements are referred to by the same numerals, in which.

DETAILED DESCRIPTION OF A PREFERRED EMBODIMENT

Figure 1:
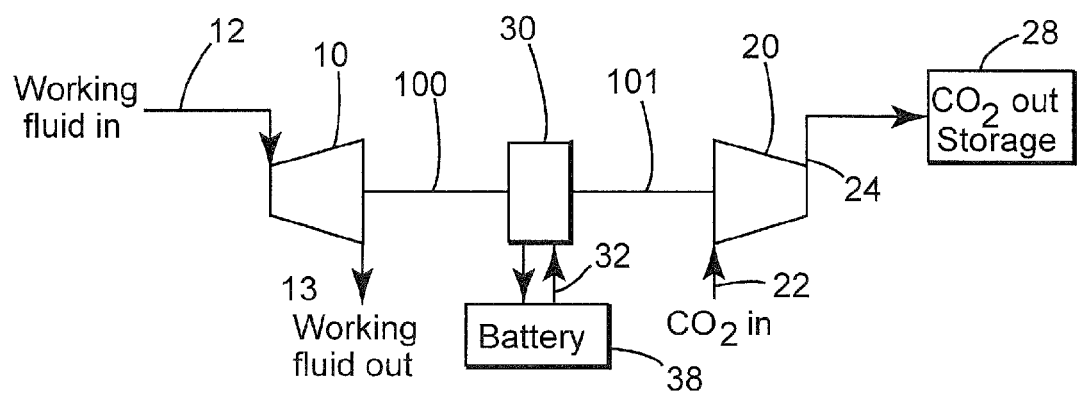
FIG. 1 is a schematic view of one embodiment of an apparatus and system for implementing the inventive method.

Referring to FIG. 1 which schematically illustrates an embodiment of the apparatus for effecting the inventive method, a $CO_2$ compressor 20, a turbine 10 and a motor-generator 30 are coupled coaxially on axles or shafts 100, 101, respectively, to perform their functions. The compressor 20 receives substantially pure $CO_2$ via conduit 22 from an upstream capture system (not shown). Compressed $CO_2$ passes via discharge conduit 24 to $CO_2$ storage unit 28. Turbine 10 recovers energy from an energy recovery system or power cycle. The electric motor-generator 30 adds power, as needed to operate the compressor or recovers the excess power from the turbine and converts it to electricity that is passed via conductors 32 to battery 38 where it is stored for later use, or from which it can be used directly on board the vehicle.

The turbine 10 can be operated by any working fluid under pressure and preferably a working fluid from an open or closed power cycle, such as a Rankine cycle or trilateral flash cycle or other cycle in which a working fluid is compressed, optionally heated, and then expanded in the turbine.

Figure 2:
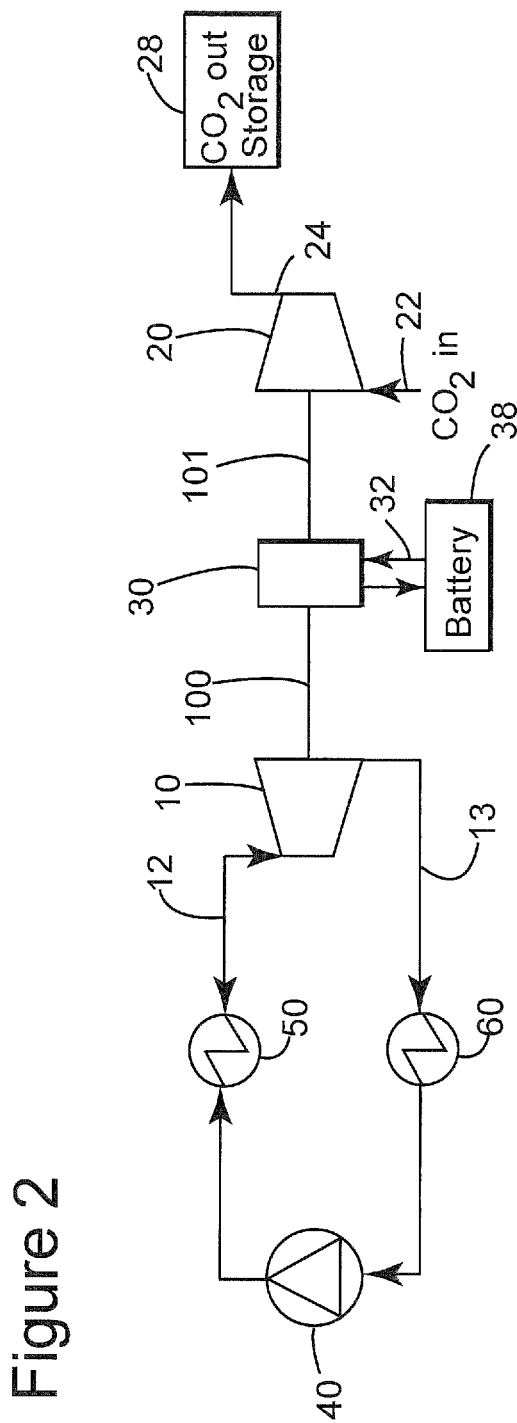
FIG. 2 is schematic representation of an embodiment in which a Rankine Cycle used for operating the power generating turbine.

In a Rankine cycle embodiment shown in FIG. 2, the working fluid 13 is compressed by a pump 40 to a higher pressure and then heated in a heating device 50 to the desired temperature before it is conveyed to the turbine 10 inlet port. The working fluid is expanded in the turbine 10 to the low pressure value and cooled in the condenser or cooler 60 before it is conveyed to pump 40 suction line to complete the cycle.

In the embodiment of the apparatus shown in FIG. 1, the turbine, $CO_2$ compressor and motor-generator are coupled coaxially and perform at the same rotational speed. In order to operate these components at different speeds, coupling/decoupling devices or velocity controllers or velocity couplings are incorporated in the system to secure the operation of the hybrid turbine/compressor set. Coupling devices provide several options: they can be used to reduce the rotational speed, or to control the speed and prevent overrunning, or to synchronize the speed allowing limited slip, or to uncouple the rotation, or combined to perform a combination of these functions.

Figure 3:
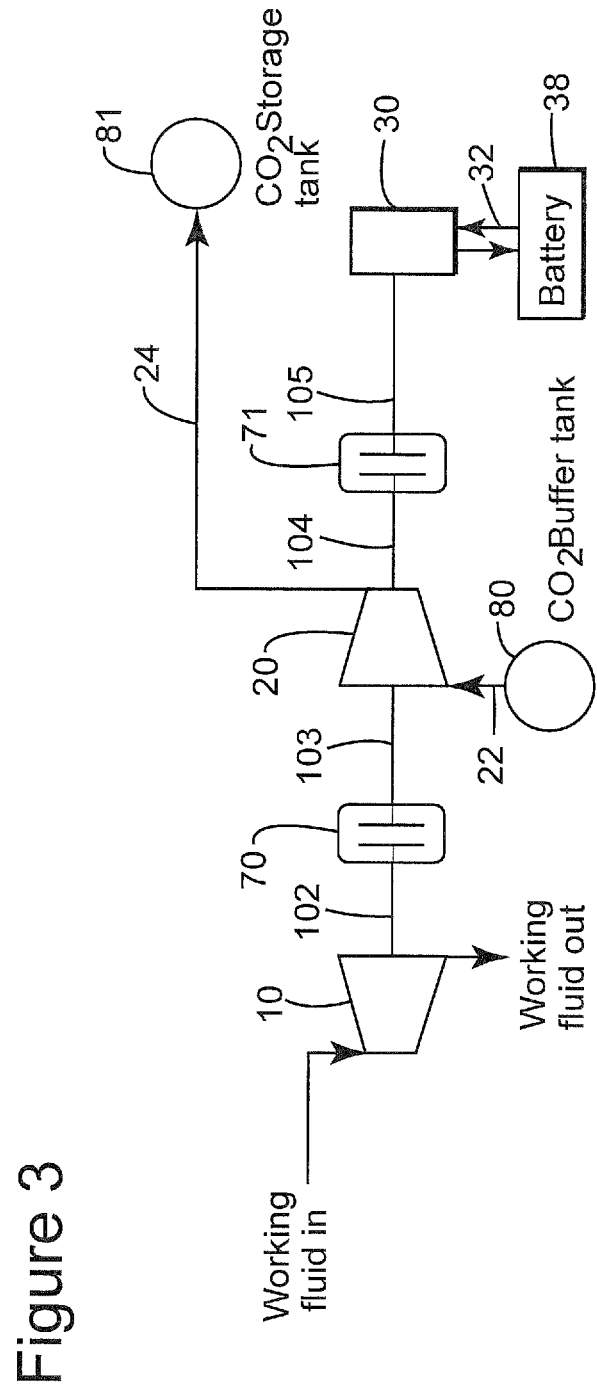
FIG. 3 is a schematic illustration of another embodiment of an apparatus for implementing the inventive method.

An embodiment of the apparatus with coupling devices is shown in FIG. 3, where coupling devices 70, 71 are arranged between different components of the hybrid turbine/compressor system according to the present invention.

In an exemplary embodiment, a planetary gear 70 has an input connected to the output shaft 102 of the turbine 10 and an output connected to the input shaft 103 of the compressor 20. The planetary gear allows separate control of the rotational speeds of the turbine 10 and the compressor 20. In place of the planetary gear, a speed reducing gear box or a CVT can be used. A second coupling device 71, such as a speed reducer, provides a power link between the compressor 20 and the motor-generator 30 which, in the embodiment shown in FIG. 3, is arranged downstream of the compressor 20. The coupling device 71 is connected to the output end 104 of the compressor shaft and the input shaft 105 of the motor-generator 30.

In the embodiments of the simple option or the hybrid option, it is preferred to include a $CO_2$ buffer tank 80 equipped with an automated or manually controlled pressure regulator upstream of the $CO_2$ compressor 20 inlet. The buffer tank 80 serves to regulate the $CO_2$ pressure at the $CO_2$ compressor inlet and in regulating the $CO_2$ flow that will be compressed. The outlet of the compressor 20 is in fluid communication with $CO_2$ storage tank 81.

Figure 4:
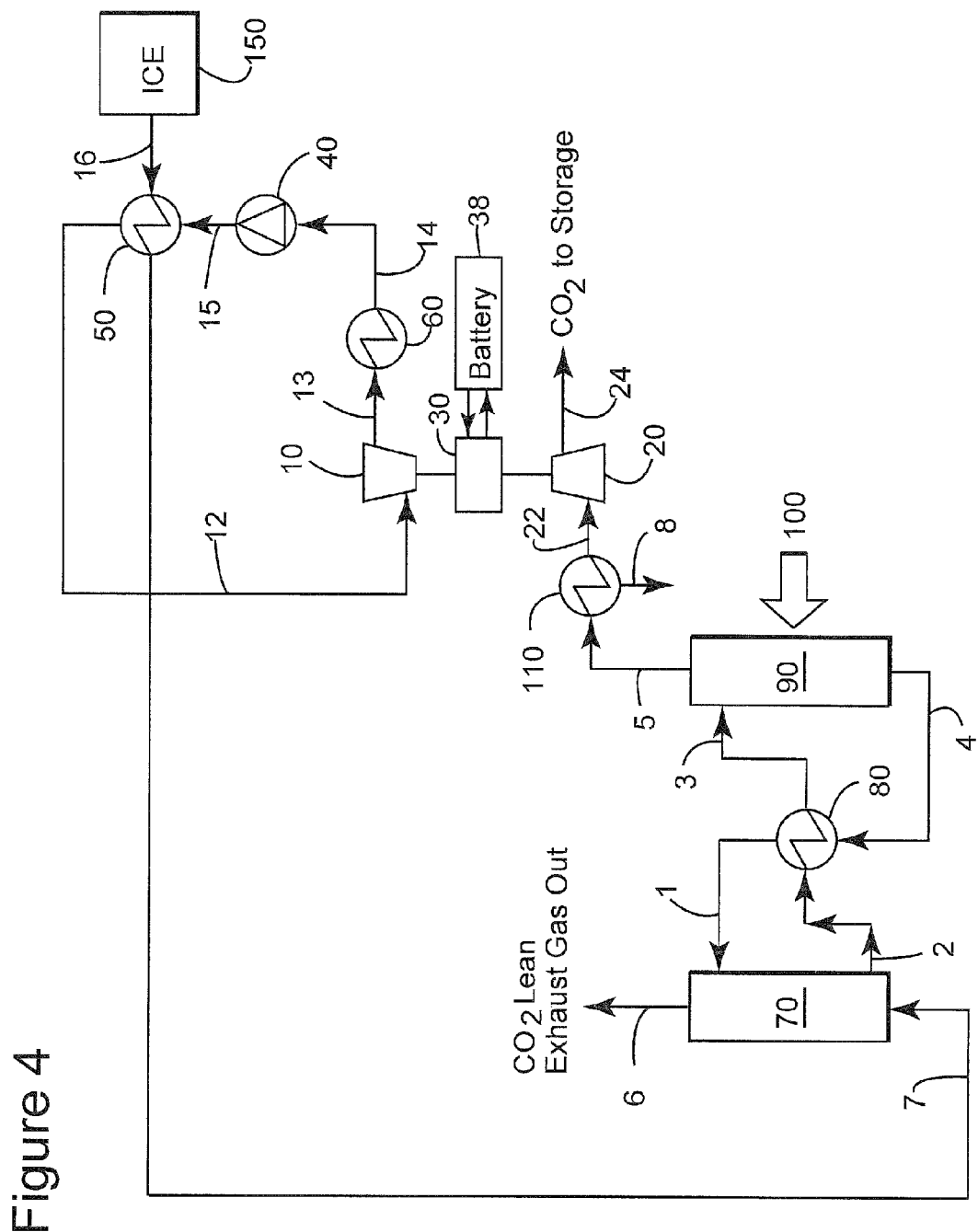
FIG. 4 is a schematic illustration of a $CO_2$ removal system integrated with an exhaust gas energy recovery system.

An embodiment is shown in FIG. 4 in which the $CO_2$ removal system is integrated with the exhaust gas stream energy recovery system. The exhaust gas stream 7 enters into absorber 70 in which $CO_2$ is absorbed by a lean $CO_2$ absorbent fluid 1, e.g., an aqueous solution of monoethanolamine (MEA). A $CO_2$-lean exhaust gas stream 6 exits the absorber 70 and is released into the atmosphere.

The initially lean MEA stream 1 entering the absorber 70 absorbs $CO_2$ from the exhaust gas stream in the absorber 70 and exits via stream 2 as a $CO_2$-rich MEA stream. The $CO_2$-rich MEA stream 2 is pumped for heating in heat exchanger 80 before entering the $CO_2$ stripper 90 via stream 3. For simplicity, pumps in the $CO_2$ removal loop are not shown.

A heat flow 100, e.g., the engine coolant or engine exhaust gas stream, passes in heat exchange through the stripper 90 to strip the $CO_2$ from the solvent. The $CO_2$ stream containing some water vapor exits the stripper via stream 5. The regenerated lean $CO_2$ solvent leaves the stripper via stream 4 and is passed in heat exchange with the $CO_2$-rich stream 2 in heat exchanger 80 prior to being recycled to the $CO_2$ absorber 70 via stream 1.

The $CO_2$ and water vapor stream 5 exiting the $CO_2$ stripper 90 is cooled, e.g., by ambient air, in heat exchanger 110 to condense the water and remove it from the system via liquid/vapor separator and discharge it as stream 8. The $CO_2$ stream 22 exiting heat exchanger 110 is fed to the suction side of the $CO_2$ compressor 20 operated by turbine 10. The $CO_2$ compressor 20 is linked to the turbine 10 via direct link or through reducers and visco-couplers, as described above.

Turbine 10 is integrated into a Rankine cycle which is fed by a high pressure vapor stream 12 which can be water vapor or any organic fluid that is compatible with the energy recovery system pressures and temperatures. Stream 12 expands in turbine 10 to provide power and then exits via stream 13 to feed the condenser 60 where it is completely condensed to a liquid state. The liquid exits condenser 60 via stream 14 to enter the suction port of pump 40 where it is compressed to the system high pressure value. Pump 40 compresses the liquid stream 14 and delivers it under pressure via stream 15 to the boiler 50 where it is partially or totally evaporated before passing to the turbine 10 via stream 12.

The heat of the boiler 50 is provided by the exhaust gas stream 16 exiting the ICE 150 which passes through the boiler 50. The cooler exhaust gas stream leaves the boiler 50 and is fed to the $CO_2$ absorber 70 via stream 7.

Figure 5:
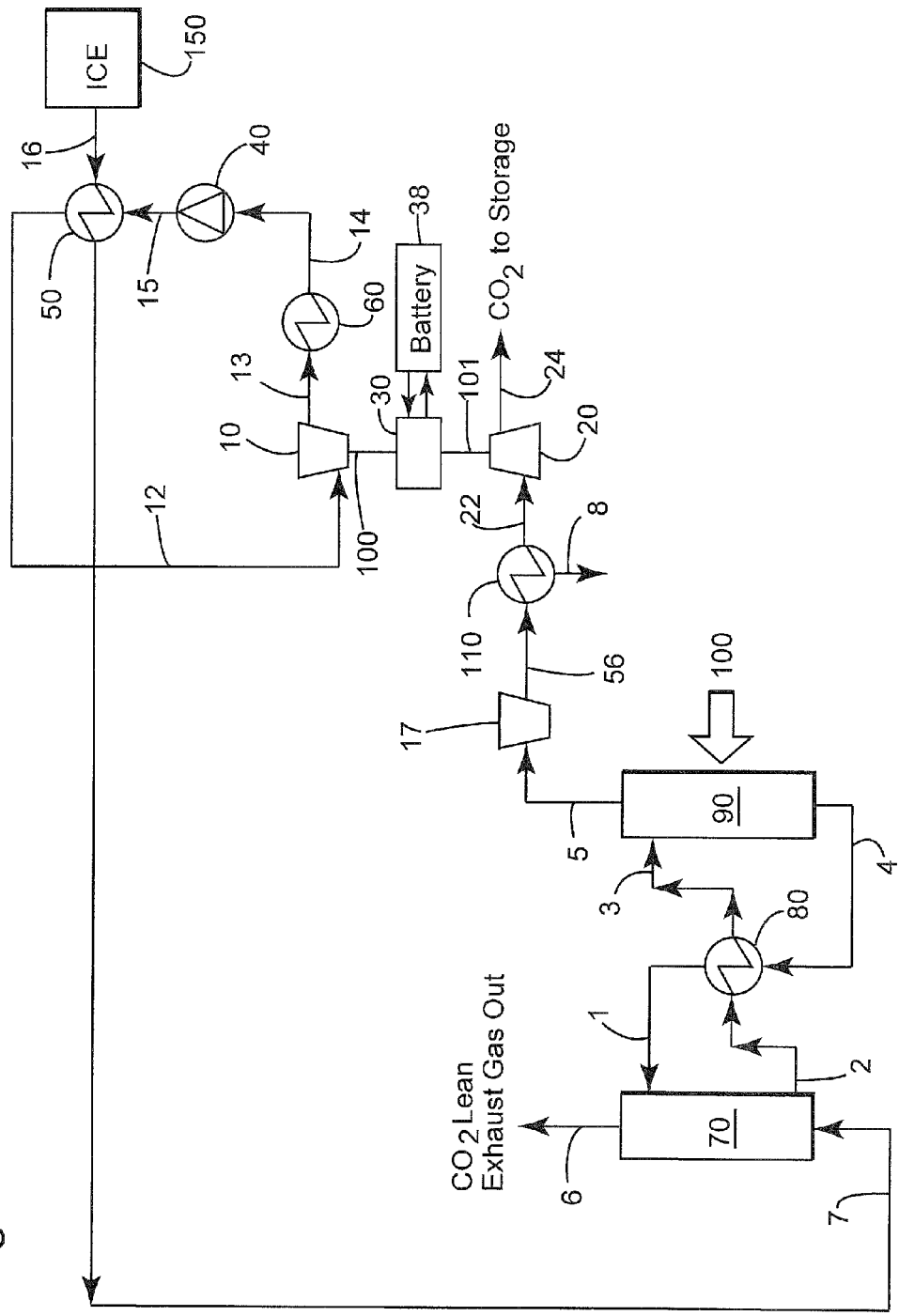
FIG. 5 is another embodiment of a $CO_2$ removal system integrated with an exhaust gas energy recovery system in which a turbine is integrated upstream of the $CO_2$ compressor.

A further embodiment of the invention which integrates a turbine upstream of the $CO_2$ compressor is depicted in FIG. 5. In this embodiment, the $CO_2$ stripper is operated at a higher pressure, i.e., 50 to 10 bar. The $CO_2$ rich solvent stream 2 exiting the $CO_2$ absorber 70 is compressed to a higher pressure, i.e., 5 to 10 bar, in order to operate the $CO_2$ stripper 90 at a higher pressure.

The resulting high pressure $CO_2$ and water vapor stream 5 leaving the $CO_2$ stripper 90 is expanded in the turbine 17 to nearly ambient pressure prior to entering heat exchanger 110 via stream 56 for water vapor condensation and removal from the system as stream 8. The dry $CO_2$ stream 22 is then compressed in the compressor 20 and passed for storage on board the vehicle. The mechanical energy recovered from turbine 17 can be used to generate electricity that can be used directly on board or stored in battery 38.

In another embodiment, the turbine 17 can be coupled to the $CO_2$ compressor 20 and turbine 10 to assist with the $CO_2$ compression. In yet another embodiment, turbine 17 is linked to compressor 20 and an electric motor without the use of turbine 10. The energy to compress the $CO_2$ to its final pressure is delivered primarily by turbine 17 and supplemented by the electric motor.

Though the present invention has been illustrated and described with reference to the preferred embodiments, they are not to be construed as limiting and various modifications of the present invention will be apparent to those skilled in the art, and the scope of the invention is to be determined by the claims that follow.

What is claimed is:

1. A method of driving a $CO_2$ compressor that forms part of a $CO_2$ capture system on board a mobile source for recovery of $CO_2$ from the exhaust gas stream of an ICE and its densification for storage on board the mobile source, the compressor having a drive shaft and a $CO_2$ intake port, the method comprising the steps of:

providing a turbine operated by a pressurized working fluid, the turbine having a power output shaft operatively connected to the drive shaft of the $CO_2$ compressor for driving the $CO_2$ compressor;

heating the pressurized working fluid prior to its introduction into the turbine using waste heat produced on board the mobile source by heat exchange with heat-emitting components on board the mobile source; and providing a motor-generator operatively connected to the drive shaft of the $CO_2$ compressor for recovering excess power when the turbine-generated power exceeds the $CO_2$ compressor power demand, and for supplying supplemental power when the turbine-generated power is insufficient to meet the power demand of the $CO_2$ compressor.

2. The method according to claim 1, wherein the heat-emitting components include the hot exhaust gas stream, the cooling system of the ICE, the engine block, the $CO_2$ compressor, an on board air conditioning condenser, brake assemblies, exterior solar panels, and one or more intercoolers.

3. The method according to claim 1, wherein the turbine and the $CO_2$ compressor have different rotational speeds, and the method further comprises the step of providing a velocity coupling device between the turbine and the $CO_2$ compressor.

4. The method according to claim 1, wherein the motor-generator is operatively connected to the turbine power output shaft.

5. The method according to claim 1, wherein the pressurized working fluid is the exhaust gas stream from the ICE, and the turbine powered by the exhaust gas stream is operatively connected to the $CO_2$ compressor.

6. The method according to claim 1, further comprising the step of providing a $CO_2$ buffer tank in fluid communication with the $CO_2$ intake port of the $CO_2$ compressor.

7. The method according to claim 1, wherein an additional turbine that is not operatively connected to the $CO_2$ compressor is located upstream of the $CO_2$ compressor.

8. The method according to claim 1, wherein the motor-generator is operatively connected to the drive shaft of the $CO_2$ compressor intermediate the power output shaft of the turbine.

9. The method according to claim 1, wherein the motor-generator is operatively connected to a portion of the drive shaft of the $CO_2$ compressor opposite the portion that is operatively connected to the turbine power output shaft.

10. The method according to claim 1, wherein the motor-generator is connected to an on-board storage battery and excess energy from the operation of the generator is passed to the battery.

11. An integrated $CO_2$ capture system on board a mobile source for the recovery of $CO_2$ from the exhaust gas stream of a supercharged or turbo-charged internal combustion engine, the system comprising a $CO_2$ compressor, an exhaust gas-driven turbine, a motor-generator, and an engine air compressor that are coaxially coupled to the same axle, and further comprising a $CO_2$ storage unit in fluid communication with the $CO_2$ compressor outlet and a battery operatively connected to the motor-generator to provide electrical energy when power is needed to drive the $CO_2$ compressor and for storage of electrical energy when an excess of power is produced by the motor-generator.

* * * * *